United States Patent Office.

JOHN COMMINS, OF CHARLESTON, SOUTH CAROLINA.

*Letters Patent No.* 74,799, *dated February* 25, 1868; *reissue No.* 3,008, *dated June* 30, 1868.

IMPROVED MODE OF TREATING MINERAL PHOSPHATES FOR THE MANUFACTURE OF FERTILIZERS.

The Schedule referred to in these Letters Patent and making part of the same.

TO ALL WHOM IT MAY CONCERN:

Be it known that I, JOHN COMMINS, of Charleston, in the district of Charleston, and State of South Carolina, have invented new and useful Improvements in Treating Phosphatic Minerals or Earths; and I do hereby declare that the following is a full, clear, and exact description thereof, which will enable those skilled in the art to understand and use the same.

This invention or discovery relates to an improved mode of treating natural phosphates or phosphatic minerals and earths, for the purpose of rendering them soluble to serve as fertilizers.

Natural phosphates are not soluble in water, when applied to the soil, and therefore do not act as manures for nourishing plants.

Various attempts have been made to utilize phosphatic minerals and earths, by the use of acids and other chemical applications, but, for practical purposes, no method of treatment has hitherto proved successful.

Some simple and cheap process is desired, whereby the farmer or planter can avail himself of the valuable mineral deposits of phosphates which are found in various parts of the country, and by rendering them soluble in water, can employ this important element of growth in plants for restoring and improving their exhausted lands, especially in the southern States.

My improved mode of treatment is extremely simple and cheap, and I have found by experience that it is effectual in converting the insoluble natural phosphates into a soluble mineral that may be most advantageously employed in mixing with other manures, for increasing the fertility of the soil.

The phosphatic minerals or earths containing insoluble phosphorus in chemical combination, are placed in a furnace or kiln, and heated to a red heat, or the mass may be intermixed with charcoal, stone-coal, or wood, in a heap, like a pit for burning charcoal or roasting ores; and when the mass of mineral has been thoroughly heated up to a red or white heat, it is saturated with a solution of common salt, which may be done by plunging it into a vessel or tank containing salt water, or pouring the water upon the mass until it is thoroughly saturated. This treatment converts the natural phosphates from an insoluble into a soluble state in water, whereby they may be usefully applied to a soil as a fertilizer.

Having thus described my invention, what I claim as new, and desire to secure by Letters Patent, is—

Uniting, while hot, phosphatic minerals or earths, with a solution of common salt, (chloride of sodium,) and water, in part or whole, as and for the purpose herein described.

JOHN COMMINS.

Witnesses:

E. H. YATES,

J. E. BURKE.